April 19, 1960 R. H. DEITRICKSON Re. 24,812

HYDRAULIC SUB-SURFACE PUMPING UNIT

Original Filed June 28, 1954 6 Sheets-Sheet 1

INVENTOR.
Roy H. Deitrickson
BY
Owen & Owen
ATTORNEYS

HYDRAULIC SUB-SURFACE PUMPING UNIT

Original Filed June 28, 1954 6 Sheets-Sheet 2

| AREA | | SIZE |
|---|---|---|
| A | = | 4 |
| a | = | 2 |
| B | = | 4 |
| x(A-a) | = | 2 |

TOTAL FORCE REQUIRED

| | DOWN-STROKE | | UP-STROKE | |
|---|---|---|---|---|
| | UP | DOWN | UP | DOWN |
| A=4 | | P | | p |
| x=2 | P | | P | |
| B=4 | p | | No Pressure | |
| NET | 4P-2P-4p = 2P-4p | | 2P-4p | |

INVENTOR.
Roy H. Deitrickson
BY
Owen & Owen
ATTORNEYS

HYDRAULIC SUB-SURFACE PUMPING UNIT
Original Filed June 28, 1954 6 Sheets-Sheet 3
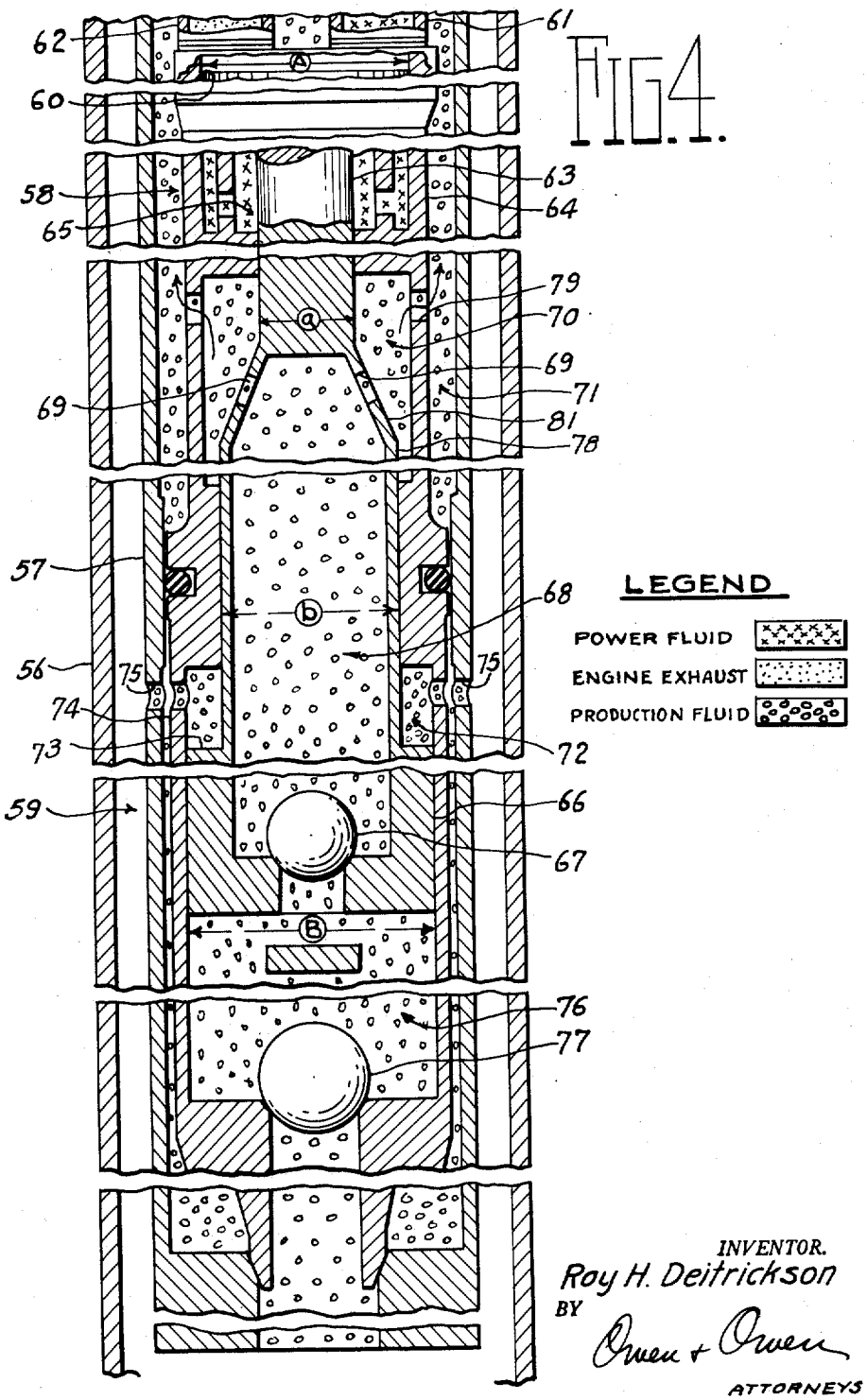
INVENTOR.
Ray H. Deitrickson
BY
Owen & Owen
ATTORNEYS

HYDRAULIC SUB-SURFACE PUMPING UNIT

Original Filed June 28, 1954 6 Sheets-Sheet 4

FIG. 5.

| AREA | | SIZE |
|---|---|---|
| A | = | 4 |
| a | = | 2 |
| b | = | 3 |
| B | = | 6 |
| $x = (A-a) = 2$ | | |
| $y = (b-a) = 1$ | | |

PRESSURES

Power Oil = P
Production Fluid } = p

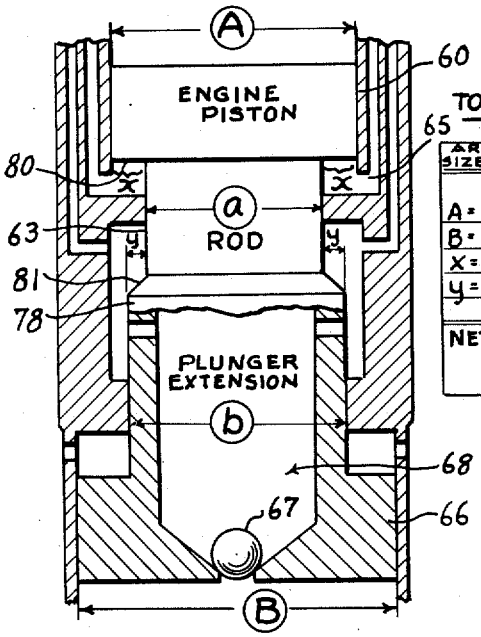

TOTAL FORCE REQUIRED

| AREA & SIZE | DOWN-STROKE | | UP-STROKE | |
|---|---|---|---|---|
| | UP | DOWN | UP | DOWN |
| A = 4 | | P | | p |
| B = 6 | p | | No Pressure | |
| x = 2 | P | | P | |
| y = 1 | | p | | p |
| NET | 4P-2P+p-6p or 2P-5p | | 2P-p-4p or 2P-5p | |

FIG. 6.

| AREA | | SIZE |
|---|---|---|
| A | = | 4 |
| a | = | 2 |
| B | = | 8 |
| b | = | 4 |
| $x(A-a) = 2$ | | |
| $y(b-a) = 2$ | | |

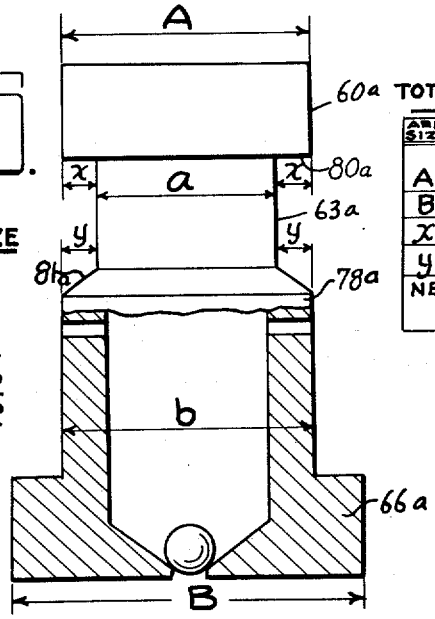

TOTAL FORCE REQUIRED

| AREA & SIZE | DOWN-STROKE | | UP-STROKE | |
|---|---|---|---|---|
| | UP | DOWN | UP | DOWN |
| A = 4 | | P | | p |
| B = 8 | p | | No Pressure | |
| x = 2 | P | | P | |
| y = 2 | | p | | p |
| NET | 4P-2P-8p+2p or 2P-6p | | 2P-4p-2p or 2P-6p | |

INVENTOR.
Roy H. Deitrickson
BY Owen & Owen
ATTORNEYS

HYDRAULIC SUB-SURFACE PUMPING UNIT

Original Filed June 28, 1954 6 Sheets-Sheet 5

INVENTOR.
Roy H. Deitrickson
BY
Owen + Owen
ATTORNEYS

HYDRAULIC SUB-SURFACE PUMPING UNIT

Original Filed June 28, 1954 6 Sheets-Sheet 6

INVENTOR.
Roy H. Deitrickson
BY
Owen & Owen
ATTORNEYS

United States Patent Office

Re. 24,812
Reissued Apr. 19, 1960

24,812

HYDRAULIC SUB-SURFACE PUMPING UNIT

Roy H. Deitrickson, Allison Park, Pa., assignor, by mesne assignments, to The National Supply Company, a corporation of Ohio Original No. 2,813,489, dated November 19, 1957, Serial No. 439,840, June 28, 1954. Application for reissue October 29, 1959, Serial No. 849,699

5 Claims. (Cl. 103—46)

Matter enclosed in heavy brackets [ ] appears in the original patent but forms no part of this reissue specification; matter printed in italics indicates the additions made by reissue.

This invention relates to sub-surface hydraulic pumping units and more particularly to sub-surface hydraulic pumping units of the type employed in deep wells such as oil wells and to such a pumping unit which is designed to balance the pressure requirements on both the up and down strokes and thus permit uniform speed of operation on both strokes as well as uniform loading of the surface equipment from which the working pressure is derived.

Sub-surface hydraulic pumping units of the type referred to are actuated by power fluid pumped down the well from equipment at the surface to the pumping unit. The power fluid is introduced into a pumping unit engine which is connected by a rod to a production pump located at the production fluid level. The pumping unit consisting of the engine and pump may be connected to the surface by means of a so-called "macaroni" string for carrying the power fluid from the surface down to the pump or it may be of the type denominated a "free pump" which is lowered down the pump tubing without any direct surface connection.

In either case it is preferable that the load on the surface equipment which creates the pressure in the power fluid should remain constant during the operation of the pump engine whether on an up stroke or on a down stroke. It is also desirable that the speed of operation on both strokes be approximately uniform since the operation of the pump and engine valving is improved if there is no tendency of the unit to race in one direction and work slowly in the other.

It is, therefore, the principal object of this invention to provide a sub-surface hydraulic pumping unit comprising an engine and a production pump that is actuated by power fluid pumped from the surface in which the pressure and volume of the power fluid are balanced at the same values during the up and down strokes.

It is a further object of this invention to provide a sub-surface hydraulic pumping unit in which the various areas of the engine and production pump which are exposed to power and production fluids are so proportioned as to result in a net load on the power fluid pumping means which remains relatively constant during up and down strokes of the pump engine.

Other and more specific objects and advantages will be better understood from the specification which follows and from the drawings in which:

Fig. 4 is a view similar to Figs. 1 and 2 but illustrating a closed circuit, surface connected, hydraulic pumping unit embodying the invention.

Fig. 5 is a schematic view similar to Fig. 3 but of the hydraulic pumping unit shown in Fig. 4.

Fig. 6 is a view similar to Fig. 5, describing a pump of the general type shown in Fig. 4 but having different proportions.

Figure 1:
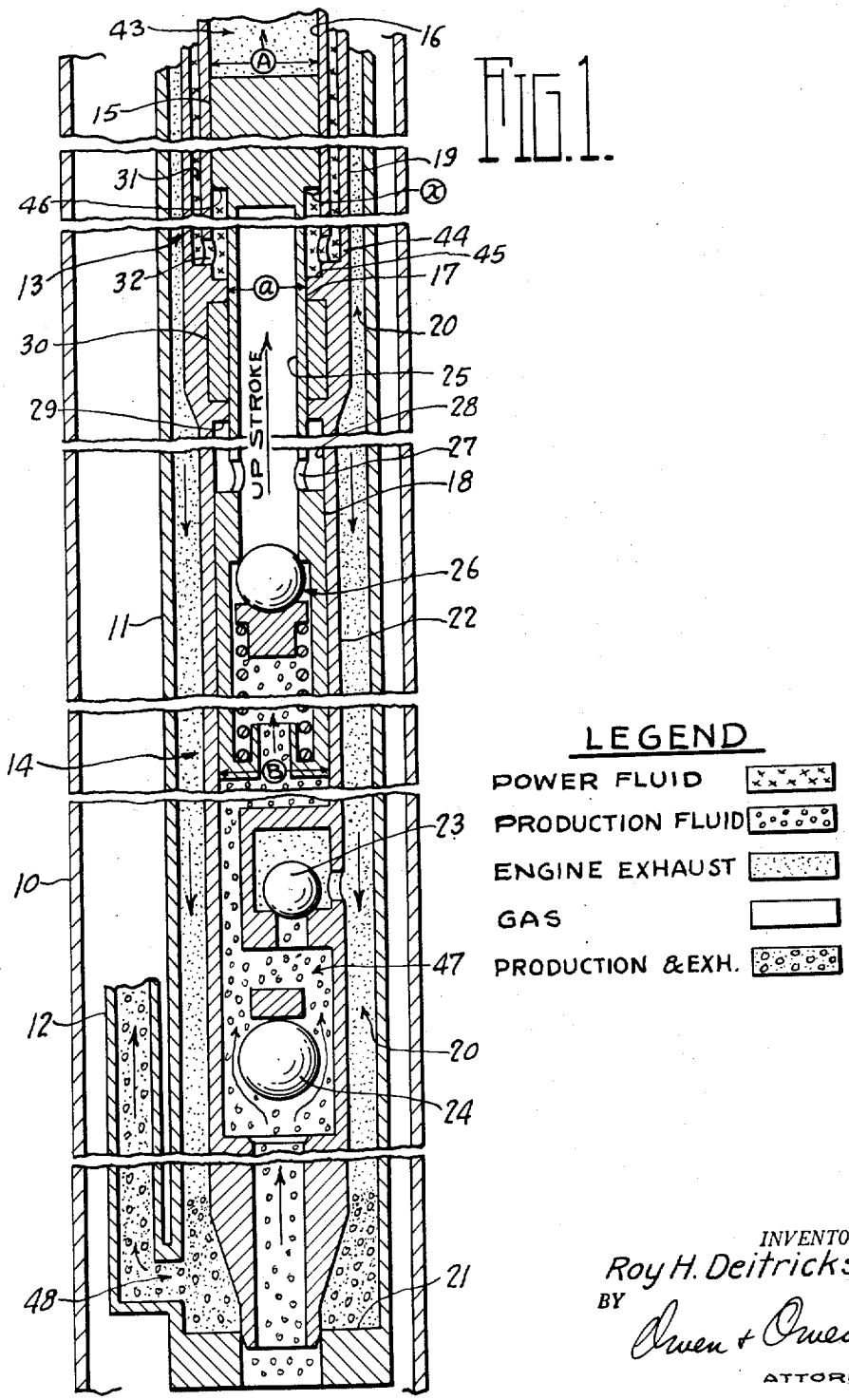
Fig. 1 is a fragmentary vertical sectional view of a "free" hydraulic pumping unit embodying the invention; the mechanism being shown during an upstroke.
Figure 2:
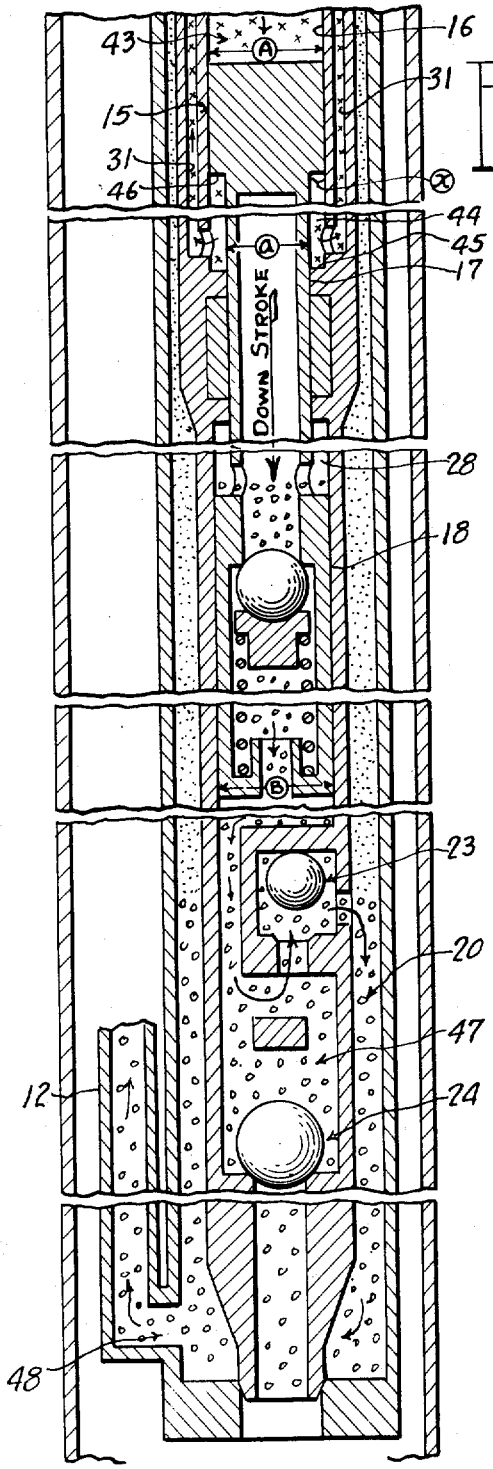
Fig. 2 is a view similar to Fig. 1 but showing the mechanism during a down stroke.
Figure 3:
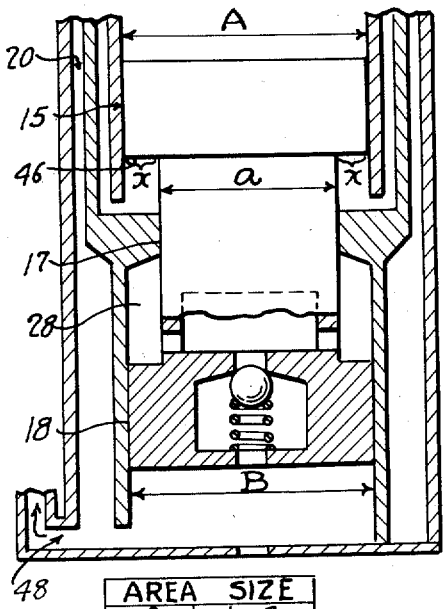
Fig. 3 is a schematic drawing of the mechanism shown in Fig. 1 and illustrating the balancing of working or power fluid pressures.

Figs. 1–3 illustrate a sub-surface hydraulic pumping unit of the type generally known as a "free pump," which embodies the invention. The sub-surface hydraulic pumping unit of the invention is shown in a conventional background comprising a well casing 10 which serves as the wall of the well and encloses a pump tubing 11 and a macaroni string 12, in this case employed for carrying a mixture of production fluid and spent power fluid to the surface. A hydraulic pumping unit embodying the invention comprises an engine generally indicated at 13 and a production pump generally indicated at 14. The engine 13 has a piston 15 that is vertically reciprocable in a pump cylinder 16 and is connected by a rod 17 to the upper end of a production pump plunger 18. The engine 13 is enclosed in an engine casing 19 of diameter somewhat smaller than the inner diameter of the well tubing 11 thus leaving an annular space 20 surrounding the engine casing 19 and leading downwardly to the bottom of the pump tubing 11 where it is closed by a conventional gas header and pump seat 21. The engine casing 19 is connected to and operatively integral with a pump casing 22 and a bottom discharge valve generally indicated at 23 places the interior of the pump casing 22 in communication with the annular space 20 surrounding the casing. At the bottom of the pump casing 22 there is located a standing ball valve generally indicated at 24. A suitable packer (not shown) is provided between the engine casing 19 and the interior of the tubing 11, the packer being disposed above the engine exhaust openings in a known manner.

The rod 17 connecting the engine piston and pump plunger is tubular, having a bore 25, the bottom end of which is closed by a spring pressed relief valve 26 and which is in communication through radial ports 27 with a pocket 28 surrounding the rod 17 between the upper end of the plunger 18 and a shoulder 29 at the upper end of the pump cylinder 22. The rod 17 is sealed by a packing 30 located between the upper end of the pump cylinder 22 and the lower end of the engine casing 19.

The bottom of the engine cylinder 16 is connected by radial ports 32 and an annular passageway 31 to valving, hereinafter described, located at the upper end of the engine 13 for carrying power fluid beneath the engine piston 15. Power fluid for causing a down stroke is admitted into the engine cylinder 16 above the engine piston 15 by the same valving when a down stroke is to be initiated. When the pressure on the upper and lower sides of the engine piston is equalized the piston moves down due to the difference in area between the upper and lower surfaces.

Figure 7:
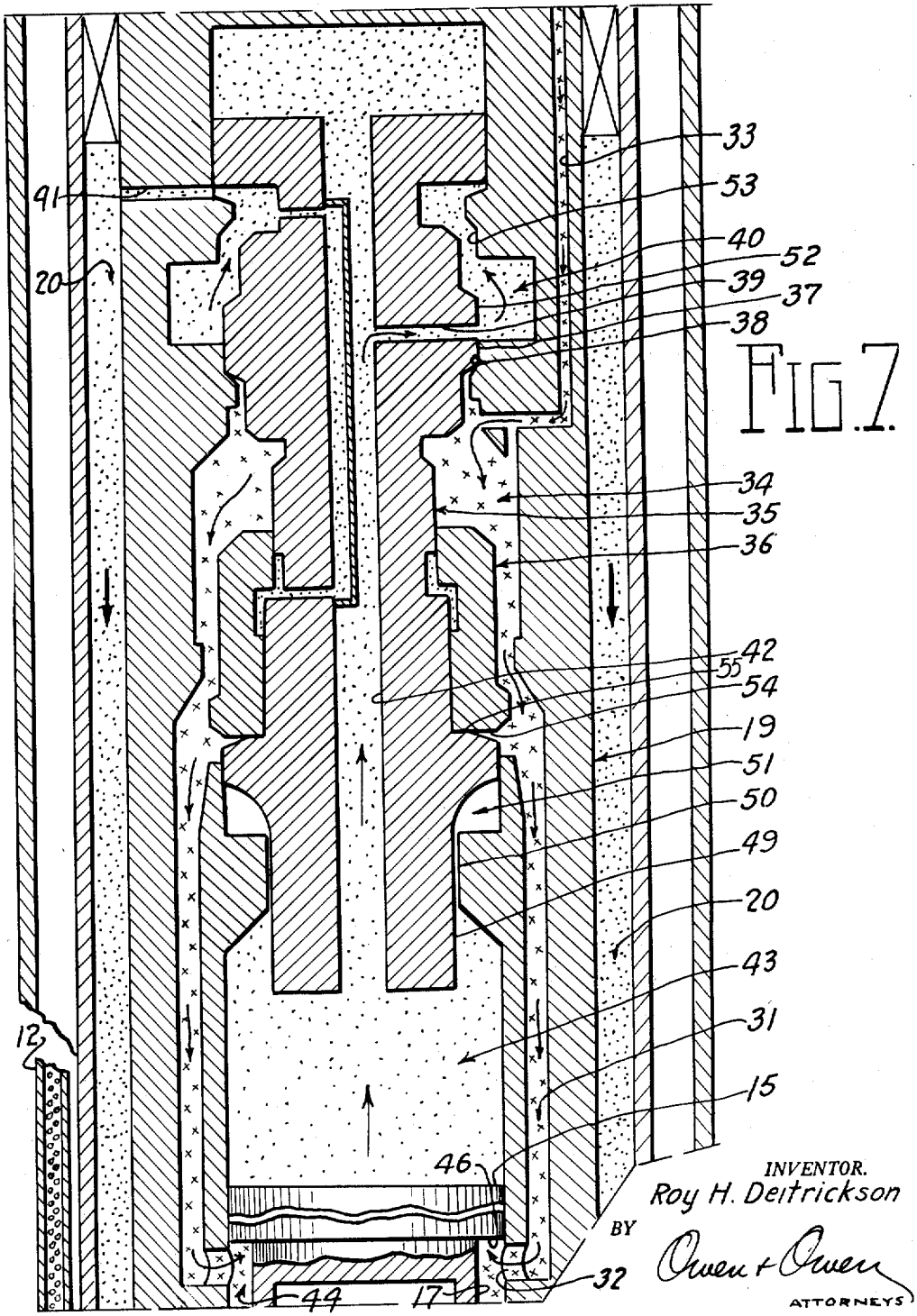
Fig. 7 is a diagrammatic view in section of valving mechanism suitable for the control of a hydraulic pumping unit embodying the invention shown in its up stroke position corresponding to the position of the pumping unit as a whole shown in Fig. 1.

Operation of the pumping unit in the up stroke with the connections established as illustrated in Figs. 1 and 7 is as follows: The engine valve illustrated in Figs. 7 and 8 and shown in Fig. 7 in the position assumed during an up stroke of the pump, is connected by a passageway 33 to a surface source of high pressure working fluid. The passageway 33 opens into a valve chamber generally indicated at 34 in which is located a vertically reciprocable valve body generally indicated at 35 and comprising a floating valve collar 36.

The operation of the valve 35 and collar 36 is described in detail and claimed in my copending application Serial No. 297,473, now Patent No. 2,682,257 issued June 29, 1954. The operation of the valving mechanism will, therefore, be described only briefly in the instant application.

In Fig. 7 it will be seen that the annular passageway 31 is a continuation of the valve chamber 34. With the valve body 35 in the position of Fig. 7 a spool valve shoulder 37 on the body 35 seats in an annular seat 38 to prevent the high pressure working fluid from flowing upwardly through the chamber 34. At the same time the position of the valve body 35 as shown in Fig. 7 connects a radial passageway 39 in the body 35 to a valving chamber 40 and the chamber 40 is connected by a series of radially extending escape ports 41 to the annular space 20 surrounding the pump and engine housing. The radial passageway 39 in the valve body 35 intersects a longitudinal bore 42 through the body 35 and through the bore 42 is in communication with a space generally indicated at 43 above the piston 15 in the engine cylinder 16.

Power fluid flowing down the annular passageway 31 flows through the ports 32 into an annular chamber 44 surrounding the rod 17 and located between a bottom 45 of the cylinder 16 and the undersurface 46 of the engine piston 15. Power fluid acting against the shoulder forming the undersurface 46 of the engine piston 15 drives the engine piston 15 upwardly pulling upwardly on the rod 17 and the pump plunger 18. This creates suction in an intake chamber 47 inside the pump casing 22 and draws production fluid into the chamber 47 displacing the standing valve 24 from its seat and filling the chamber 47. During this intake stroke, exhaust engine oil is discharged from the space 43 in the engine cylinder 16 above its piston 15 through the bore 42 and space 43, the chamber 40, the ports 41 and into the annular passageway 20 where it flows downwardly around the exterior of the engine casing 19 and pump casing 22.

The engine exhaust fluid flows down the annular passageway 20 forcing production fluid in that passageway downwardly and blending with it at the bottom of the tubing just above the seat 21 whence it passes outwardly through a connection 48 to the macaroni string 12 and to the surface. During this up stroke the static head of the fluid in the exhaust annular passageway 20 holds the bottom discharge valve 23 in its seat.

During an up stroke the volume of the pocket 28 (Fig. 1) is, of course, decreased, compressing any gas which may be located therein. The pressure in the gas in the pocket 28 is prevented from reaching too high a level by the spring pressed relief valve 26 which opens to vent the interior of the rod 17 and the pocket 28 as the gas pressure therein builds up. Gas vented by the relief valve 26 is exhausted through the bottom of the pump plunger 18 into the chamber 47.

Figure 8:
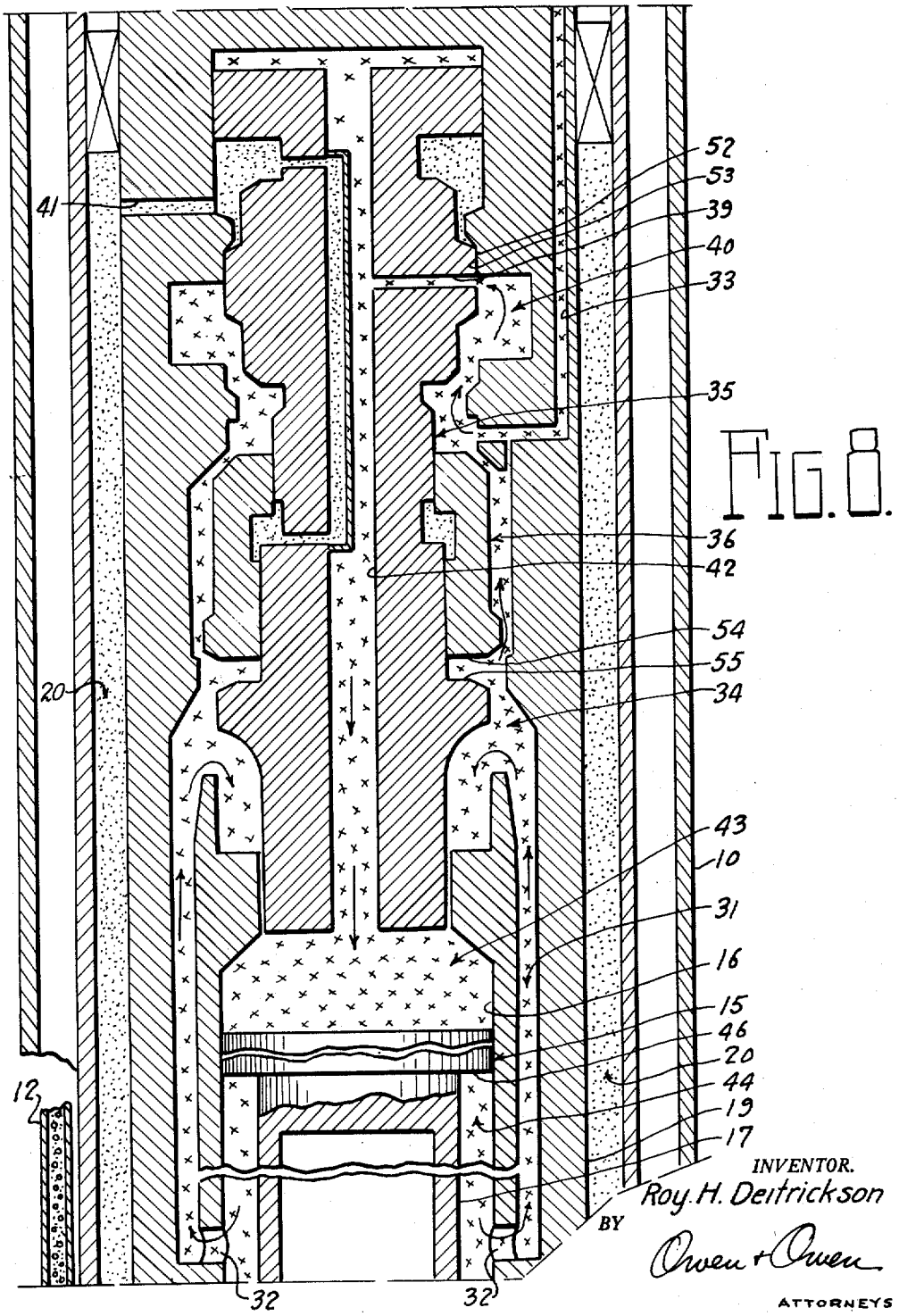
Fig. 8 is a view similar to Fig. 7 but showing the mechanism during a down stroke.

Figs. 2 and 8 illustrate the position of the pump parts and the valving during a down stroke. The valving mechanism is changed from the position shown in Fig. 7 to the position shown in Fig. 8 by the pressure created in the exhaust fluid located in the space 43 as the piston 15 approaches the limits of its upward stroke. It will be observed in Figs. 7 and 8 that a lower tubular extension 49 of the valve body 35 protrudes into the space 43 and that a small clearance is left, generally indicated at 50, around the extension 49 into an annular pocket 51 at the underside of the main body of the valve 35. A build-up of pressure within this annular pocket 51 under the conditions and balances of pressure that are completely described in the above mentioned copending application, causes the entire valve body 35 to shift upwardly opening the pocket 51 into the main valve chamber 34 and unseating the shoulder 37 from its seat 38; at the same time seating a similar shoulder 52 in an annular seat 53 at the upper side of the chamber 40. This closes the connection between the chamber 40 and the escape ports 41 and establishes a connection between the passageway 33 to the chamber 40 as shown in Fig. 8. Power fluid now flows from the passageway 33 to the chamber 40 through the passageway 39 and bore 42 through the valve body 35 and into the space 43 above the piston 15. The pressure of working fluid on the upper face of the piston 15 overcomes the pressure of working fluid on the annular underface 46 of the piston 15 and drives the piston 15 downwardly.

It will be seen in Fig. 8, however, that the chamber 44 beneath the piston 15 is still connected through the ports 32 to the annular passageway 31 and that these spaces are in communication through the chamber 34 with the high pressure fluid line 33. Downward movement of the piston 15 therefore results from a balancing of the pressures on the upper and lower faces of the piston 15 and high pressure oil flows upwardly through the passageway 31 and past cooperating shoulders on the inner wall of the chamber 34, the valve body 35 and the floating valve collar 36. As the piston 15 moves downwardly all of the high pressure fluid trapped in the chamber 44 flows upwardly through the passageway 31 and into the chamber 34 being augmented by additional high pressure fluid from the passageway 33 to displace the piston 15 downwardly. There is no discharge of spent or exhaust power fluid from the valving during the down stroke.

The action of the floating collar 36 and other elements of the valve mechanism shown in Figs. 7 and 8 and not described herein in full detail is fully explained in the copending application mentioned above.

Downward movement of the engine piston 15 thrusts the rod 17 and pump plunger 18 downwardly. Pressure on the fluid in the production fluid chamber 47 seats the standing valve 24 at the botom of the chamber 47 and lifts the bottom discharge valve 23 from its seat permitting production fluid in the chamber 47 to be exhausted through the discharge valve 23 and into the production fluid annular passageway 20. Production fluid in the passageway 20 is forced downwardly to the bottom and outwardly through the connection 48 in the macaroni string 12 to the surface.

Bottom reversal of the direction of movement of the piston 15 occurs when the piston 15 approahes the bottom of its stroke and the rate of flow of the power fluid upwardly through the annular passageway 31 and past the floating collar 36 drops. When this flow of oil is reduced sufficiently the high pressure oil in the chamber 34 above the collar 36 moves the collar 36 downwardly until its lower shoulder 54 engages an opposed shoulder 55 on the valve body 35 and moves the valve body 35 bodily downward into the position shown in Fig. 7. A more complete explanation of this operation appears in the above identified copending application.

With reference now to Fig. 3, it will be seen that the forces acting on the engine piston 15 and the pump plunger 18 during a down stroke and an up stroke can be demonstrated as being equal so that the same load is maintained on the power fluid pump which actuates the engine piston 15 during both down and up strokes, and the speed of operation will be the same on both strokes.

The area of the top of the engine piston 15 is indicated by the letter A and may be, for example, 4 square inches. If the area of the rod 17 (a) is 2 square inches, then the area of the annular surfaces 35 (x) is 2 square inches (A—a or 4—2). In this particular pumping unit the area of the bottom of the pump plunger 18, denominated B, is also 4 square inches.

During a down stroke (Fig. 2) area A is exposed to power fluid indicated in the table appearing with Fig. 3 by the letter P. This force is acting downwardy to produce the down stroke being performed. At the same time, since the underside of the engine piston 15, i.e., the surface 46, also is exposed to power fluid, the area x is exposed to power fluid which acts in an upward direction. During a down stroke the bottom of the pump plunger 18, area B, is exposed to the pressure of the standing column of production fluid leading from the surface of the well. This production fluid pressure is indicated by the letter p in the table appearing with Fig. 3. The net force which must be overcome by the pressure of the power fluid acting downwardly on the engine piston 15 during a down stroke is the sum of the following pressures: Down area A×P or 4P+Up area x×P or 2P+ area B×p or 4p. The net down pressure is, therefore, (4P—2P—4p) or 2P—4p.

During an up stroke, power fluid at high pressure is present in the chamber 44 beneath the engine piston 15 and the area x is exposed to high pressure. At the same time the area A above the engine piston 15 is vented to the exhaust fluid annular passageway 20 so that the surface A is under the production fluid column pressure or p. During an up stroke the area B on the bottom of the plunger 18 is under no pressure at all since the plunger is moving upwardly and production fluid is being drawn into the chamber 47 (Fig. 1). The force required therefor to produce an up stroke is the sum of the upwardly acting force P on the area x or 2P minus the production fluid column pressure p acting on the area A or 4p. Again the net pressure required to produce an up stroke equals 2P—4p.

An identical situation prevails in a surface connected pump such as the pump illustrated in Fig. 4. In Fig. 4 there is shown a well casing 56 containing a pump tubing 57 which in turn contains a surface connected pumping unit comprising an engine indicated at 58 and a production fluid pump generally indicated at 59. The engine 58 has an engine piston 60 only fragmentarily shown at the upper end of Fig. 4 which, through valving (not shown) is alternately connected to receive power fluid from a power fluid line 61 and to exhaust spent fluid to an engine exhaust line 62. The engine piston 60 is connected to a rod 63 which extends downwardly through an engine casing 64 and through an engine cylinder 65 therein. The valving (not shown) connects the power fluid line constantly to the bottom of the cylinder 65. When the pressure on the upper and lower sides of the engine piston 60 is equalized the piston moves down due to the difference in area between the upper and lower surfaces. When the engine cylinder above the piston is connected to exhaust, the piston moves up under the influence of the power fluid beneath it.

In the form shown the pump plunger 66 and the rod 63 near its lower portion are made tubular and a traveling ball valve 67 closes and opens the lower end of the bore thus forming a chamber 68 in the interior of the rod 63 and plunger 66. The chamber 68 is connected through ports 69 to an upper pump chamber 70 located at the upper end of the production pump 59. The chamber 70 is ported to an anular production fluid passageway 71 surrounding the engine casing 64 and leading to the surface. A chamber 72 located between an upper shoulder 73 on the pump plunger 66 and the top of a cylinder 74 of the pump 59 is vented by ports 75 to the space surrounding the tubing 57 in the casing 56.

A production fluid chamber 76 is located in the pump 59 beneath the plunger 66 and provided with a standing valve 77 which alternately connects and isolates it from incoming production fluid.

During a down stroke of the pumping unit illustrated in Fig. 4 power fluid P acts over the area A of the top of the engine piston 60. This moves the piston 60 downwardly pushing the rod 63 downwardly and the pump plunger 66 downwardly. Movement of the plunger 66 downwardly lifts the traveling valve 67 from its seat and seats the standing valve 77. Production fluid passes from the chamber 76 into the bore 68 in the interior of the rod 63 and plunger 66.

To produce an up stroke the area A above the engine piston 60 is vented to the exhaust line 62 and power fluid present in the chamber 65 beneath the piston 60 moves the piston 60 upwardly. This lifts the rod 63, a lower integral plunger extension 78 and the pump plunger 66. This upward movement seats the traveling ball valving 67 and lifts the standing ball valve 77 from its seat. The upward movement of plunger extension 78 into the chamber 70 displaces production fluid in the chamber 70 forcing it outwardly through ports 79 into the passageway 71. At the same time the upward movement of the pump plunger 66 draws a new charge of production fluid into the chamber 76.

A pumping unit as illustrated in Fig. 4 and shown diagrammatically in Figs. 5 and 6, is designed for use in a well where a large volume of production is to be maintained. It will be observed that the diameter of the pump plungers of Figs. 4, 5, and 6 are larger than the diameters of the engine pistons. This permits maximum area on the pump plungers for any given diameter of well tubing with ample space around the engine casing for the production fluid to move up to the surface. The additional force on the smaller diameter engine pistons required to actuate the larger pump plungers and lift the larger volumes of production fluid may be provided by using higher pressure power fluid, or no additional force may be required if the well is shallow and easily pumped.

Reference to Figs. 5 and 6 indicates how two exemplary pumping units constructed in the just described manner are so proportioned according to the invention as to result in balanced forces during up and down strokes. In Fig. 5 the engine piston 60 is shown as having an upper area A of 4 square inches. The rod 63 is shown as having a minor area a of 2 square inches leaving an annular shoulder 80 or area x of 2 square inches. The plunger extension 78 is connected by a tapered portion 81 to the rod 63. The plunger extension 78 has an area b of 3 square inches. The projected area of the tapered portion 81 indicated by the letter y is thus b—a or 3—2 or 1 square inch. The bottom of the pump plunger 66 has an area b of 6 square inches.

Under the conditions outlined with respect to Fig. 5 the net pressure to be provided by the power fluid is calculated according to the table shown in connection with Fig. 5 where it is seen that during a down stroke the area A on the top of the engine piston 60 is exposed to high pressure P. The area x of the annular shoulder 80 beneath the engine piston 60 is, of course, also under high pressure P since the high pressure power oil exists in the chamber 65 during both up and down strokes. Thus the area A at high pressure P or 4P acts downwardly while the area x at high pressure or 2P acts upwardly. At the same time the area B on the bottom of the pump plunger 66 is under the production fluid pressure p of the standing column of production fluid and so is the projected area y of the tapered surface 81. Thus the area B results in a pressure equal to 6p tending to move the plunger 66 upwardly and the area y results in a pressure of 1p tending to move the plunger 66 downwardly. The net force is therefore the sum of area A (4P) minus area r (2P) plus area y (1p) minus area B (6p) or 4P—2P+p—6p equals 2P—5p.

During an up stroke area A on the top of the engine piston 60 is exposed to production fluid in the column of the line 62 leading to the surface. Area B during an up stroke is under no pressure at all. Area x is under the power fluid pressure P producing the upward movement and area y is (as in the down stroke) under the production fluid column pressure p. The net up stroke force required is therefore area x under power fluid pressure or 2P acting upwardly minus area y (1p) downwardly minus area A (4p) acting downwardly or 2P—p—4p equals 2P—5p or the same net force required as during the down stroke.

Fig. 6 illustrates a modified form of the pump shown in Figs. 4 and 5 in which the area B of the bottom of the pump plunger 66a is 8 square inches and thus twice as large as the area A of the engine piston 60a. The dimensions of the rod 63*a* may be the same as in Fig. 5, i.e., 2 square inches, and, for example, the area of the plunger extension 78a shown as 4 square inches (area b). The annular area x is thus 2 square inches and the annular area y is similarly 2 square inches. Under these conditions, referring to the table appended to Fig. 6, during the down stroke, power fluid P acts on area A and on area x. Production fluid p acts on areas B and y. The net force thus required to produce a down stroke is area A (4P) minus area x (2P) minus area B 8p) plus area y (2p) or 4P—2P—8p+2p or a net of 2P—6p.

Similarly during an up stroke area x is exposed to high pressure fluid for 2P acting upwardly. As explained above there is no pressure on area B. Area A is subjected to production fluid pressure (4p) acting downwardly and area y again is subjected to production fluid pressure (2p) acting downwardly. The net force therefore is 2P—4p—2p or 2P—6p, as was the case during the down stroke.

Various arrangements and relationships of areas of the several surfaces involved may be made within the scope of the invention whereby the load on the surface equipment producing the power fluid pressure remains the same during both up and down strokes of a pumping unit embodying the invention.

Having described the invention, I claim:

1. A sub-surface hydraulic pump that is adapted to be located at the production level of a well casing, comprising, a source of high pressure power fluid, a differential area fluid operated engine piston, a pump plunger having a rod connected to the said engine piston, first valve means to admit production fluid beneath said pump plunger on its upstroke and to discharge fluid against well head pressure on at least its down stroke [second valve], means to admit power fluid beneath said engine piston to cause an up stroke of said piston and *second valve means* alternately to admit power fluid above said engine piston at the same pressure to cause a down stroke of said piston, said second valve means including means to cause fluid from beneath said piston to be circulated to the space above said piston during the down stroke and including additional means to cause fluid to be exhausted from above said piston during the up stroke, the relative areas of said upper and lower engine piston surfaces and the upper and lower surfaces of said pump plunger being so proportioned that the sum of the effective areas exposed to power fluid are equal on both up and down strokes and the effective areas exposed to well head pressure are equal on both up and down strokes.

2. A sub-surface hydraulic pump according to claim 1 in which said pump plunger has a cylinder with a bottom discharge valve and the production fluid is admitted beneath said pump plunger during an upstroke whereby no pressure is exerted on the bottom thereof, and is discharged from beneath said pump plunger against well head pressure on a down stroke.

3. A sub-surface hydraulic pump according to claim 1 in which the pump plunger has a traveling valve and production fluid is admitted beneath said pump plunger during an up stroke and transferred through said valve to above said plunger during a down stroke, whereby the bottom of said pump plunger is subjected to the pressure of the production fluid column to the surface during a down stroke and production fluid is displaced from above said plunger during both up and down strokes.

4. A sub-surface hydraulic pump according to claim 1 in which the area of the upper surface of said engine piston equals the area of the lower surface of said pump plunger and is equal to twice the cross-sectional area of said rod.

5. A sub-surface hydraulic pump that is adapted to be located at the production level of a well casing, comprising, a source of high pressure power fluid, a differential area fluid operated engine piston, a pump plunger having a rod connected to said engine piston, first valve means to admit production fluid beneath said pump plunger on its upstroke and to discharge fluid against well head pressure on at least its down stroke [second valve], means to admit power fluid beneath said engine piston to cause an up stroke of said piston and *second valve means* alternately to admit power fluid above said engine piston at the same pressure to cause a down stroke of said piston, said second valve means including means to cause fluid from beneath said piston to be circulated to the space above said piston during the down stroke and including additional means to cause fluid to be exhausted from above said piston during the up stroke, the relative areas of said engine piston, pump plunger and rod being so proportioned that flow of fluid from above said engine piston plus the flow of fluid from above said pump plunger on an upon an up stroke is equal to the flow of fluid from beneath said pump plunger on a down stroke.

References Cited in the file of this patent or the original patent

UNITED STATES PATENTS

| | | |
|---|---|---|
| 825,950 | Weir | July 17, 1906 |
| 1,848,070 | Archer | Mar. 1, 1932 |
| 2,497,348 | Ecker | Feb. 14, 1950 |